US012377718B2

(12) United States Patent
Fuetterer et al.

(10) Patent No.: US 12,377,718 B2
(45) Date of Patent: Aug. 5, 2025

(54) MOTOR VEHICLE HAVING A SIDE DOOR

(71) Applicant: Mercedes-Benz Group AG, Stuttgart (DE)

(72) Inventors: Michael Fuetterer, Hildrizhausen (DE); Bernd Orschiedt, Gerlingen (DE)

(73) Assignee: Mercedes-Benz Group AG, Stuttgart (DE)

( * ) Notice: Subject to any disclaimer, the term of this patent is extended or adjusted under 35 U.S.C. 154(b) by 312 days.

(21) Appl. No.: 18/041,941

(22) PCT Filed: Jul. 26, 2021

(86) PCT No.: PCT/EP2021/070844
§ 371 (c)(1),
(2) Date: Feb. 16, 2023

(87) PCT Pub. No.: WO2022/037906
PCT Pub. Date: Feb. 24, 2022

(65) Prior Publication Data
US 2024/0025241 A1 Jan. 25, 2024

(30) Foreign Application Priority Data
Aug. 21, 2020 (DE) .................... 10 2020 005 134.0

(51) Int. Cl.
*B60J 5/04* (2006.01)
*B62D 25/02* (2006.01)

(52) U.S. Cl.
CPC ........... *B60J 5/0427* (2013.01); *B60J 5/0413* (2013.01); *B60J 5/0452* (2013.01); *B62D 25/025* (2013.01)

(58) Field of Classification Search
CPC ...... B60J 5/0412; B60J 5/0413; B60J 5/0423; B60J 5/0427; B60J 5/0429; B60J 5/043;
(Continued)

(56) References Cited

U.S. PATENT DOCUMENTS 3,964,208 A * 6/1976 Renner .................. B60J 5/0455
49/374
4,306,381 A * 12/1981 Presto .................... B60J 5/0405
49/502
(Continued)

FOREIGN PATENT DOCUMENTS

DE 23 28 829 A1 1/1975
DE 199 35 225 A1 2/2001
(Continued)

OTHER PUBLICATIONS

PCT/EP2021/070844, International Search Report dated Oct. 15, 2021 (Two (2) pages).
(Continued)

*Primary Examiner* — Patricia L Engle
(74) *Attorney, Agent, or Firm* — Crowell & Moring LLP

(57) ABSTRACT

A motor vehicle includes a body that has a doorway. A side door is moveably held on the doorway and displaceable between a closed position and an open position. The side door has an inner door part, a reinforcement element, and a planking element. The reinforcement element has an upper deformation region and a lower deformation region. An impact damper that is a foam part is disposed inside the side door between the reinforcement element and the inner door part. The impact damper extends over at least a partial length of the reinforcement element and substantially completely fills a cavity delimited between the reinforcement element and the inner door part.

3 Claims, 7 Drawing Sheets

(58) Field of Classification Search
CPC ...... B60J 5/0443; B60J 5/0444; B60J 5/0452; B60J 5/0455; B60J 5/0456; B60J 5/0458; B60J 5/0461; B60R 2021/0006; B62D 21/157; B62D 25/025
USPC .............................. 296/146.6, 146.5, 187.12
See application file for complete search history.

(56) References Cited

U.S. PATENT DOCUMENTS

| | | | | |
|---|---|---|---|---|
| 4,462,633 | A * | 7/1984 | Maeda | B62D 25/025 296/187.12 |
| 4,969,680 | A * | 11/1990 | Shimoda | B60J 5/045 49/502 |
| 5,000,509 | A * | 3/1991 | Sinnhuber | B62D 21/157 296/68.1 |
| 5,255,953 | A * | 10/1993 | Frank | B60J 5/0425 49/52 |
| 5,536,060 | A * | 7/1996 | Rashid | B60J 5/045 49/502 |
| 5,580,119 | A * | 12/1996 | Uchida | B60J 5/0461 49/502 |
| 5,603,548 | A | 2/1997 | Gandhi et al. | |
| 5,924,760 | A * | 7/1999 | Krajewski | B60J 5/045 49/502 |
| 6,302,472 | B1 * | 10/2001 | Rahmstorf | B60J 5/045 49/501 |
| 7,331,626 | B2 * | 2/2008 | Yoshimoto | B62D 21/157 296/187.12 |
| 8,118,347 | B2 * | 2/2012 | Kawashima | B60R 21/04 296/187.05 |
| 9,254,732 | B2 * | 2/2016 | Dettling | B60J 5/0451 |
| 11,697,329 | B2 * | 7/2023 | Hasegawa | B60J 5/0444 296/146.6 |
| 2002/0153742 | A1 * | 10/2002 | Ishikawa | B60J 5/0429 296/146.6 |
| 2002/0158486 | A1 * | 10/2002 | Dauvergne | B60R 21/0428 296/146.6 |
| 2002/0195833 | A1 * | 12/2002 | Fukutomi | B60J 5/0461 296/146.6 |
| 2007/0102955 | A1 * | 5/2007 | Bodin | B60J 5/0444 296/146.6 |
| 2007/0145770 | A1 * | 6/2007 | Katou | B60J 5/0437 296/146.6 |
| 2009/0284041 | A1 * | 11/2009 | Hall | B60J 5/0451 296/146.5 |
| 2010/0052360 | A1 * | 3/2010 | Hsu | B60R 21/0428 296/146.5 |
| 2010/0060031 | A1 * | 3/2010 | Duguet | B60J 5/0443 296/187.12 |
| 2014/0361576 | A1 * | 12/2014 | Storgato | B60J 5/045 296/146.6 |
| 2015/0314808 | A1 * | 11/2015 | Jenkins | B60J 5/0461 296/187.12 |
| 2016/0303953 | A1 * | 10/2016 | Fukahori | B60J 5/0427 |
| 2017/0326954 | A1 * | 11/2017 | Peidro Aparici | B60J 5/0451 |
| 2018/0111452 | A1 * | 4/2018 | Deng | B60J 5/0429 |
| 2018/0141416 | A1 * | 5/2018 | Nagaishi | B60J 5/0455 |
| 2018/0208029 | A1 * | 7/2018 | Tanaka | B60J 5/045 |
| 2018/0264919 | A1 * | 9/2018 | Ando | B60J 5/0423 |
| 2021/0023919 | A1 * | 1/2021 | Suzuki | B60J 5/0443 |
| 2021/0023923 | A1 * | 1/2021 | Honda | B62D 25/14 |
| 2021/0024138 | A1 * | 1/2021 | Kaiki | B60J 5/0427 |
| 2021/0061071 | A1 * | 3/2021 | Tabaru | B60J 5/0437 |
| 2022/0169097 | A1 * | 6/2022 | Teshima | B60J 5/0481 |
| 2023/0101929 | A1 * | 3/2023 | Kovie | B60J 5/0425 296/146.6 |
| 2023/0211652 | A1 * | 7/2023 | Daubitz | B60J 5/0458 296/146.6 |

FOREIGN PATENT DOCUMENTS

| | | | |
|---|---|---|---|
| DE | 102011101533 A1 * | 12/2011 | ............ B60J 5/0451 |
| DE | 10 2013 009 923 A1 | 3/2014 | |
| DE | 10 2014 018 662 A1 | 6/2015 | |
| DE | 10 2015 208 317 A1 | 11/2016 | |
| DE | 10 2017 001 510 A1 | 8/2017 | |
| EP | 0 527 700 A1 | 2/1993 | |
| EP | 0879720 * | 11/1998 | |
| EP | 0 879 720 B1 | 10/2003 | |
| EP | 3 224 071 B1 | 10/2017 | |
| GB | 1 469 323 A | 4/1977 | |
| WO | WO 2016/083510 A1 | 6/2016 | |

OTHER PUBLICATIONS

German-language German Office Action issued in German application No. 10 2020 005 134.0 dated May 2, 2021 (Seven (7) pages).
German-language European Office Action issued in European Application No. 21 748 894.9 dated Dec. 6, 2024 (7 pages).
German-language German Office Action issued in German application No. 10 2020 005 134.0 dated Apr. 17, 2023 (Five (5) pages).

* cited by examiner

MOTOR VEHICLE HAVING A SIDE DOOR

BACKGROUND AND SUMMARY OF THE INVENTION

The invention relates to a motor vehicle having a body having at least one doorway, on which a side door is moveably held.

It has been shown that, in the case of side doors arranged on corresponding motor vehicle bodies, the side door can be pushed over the side sill in the event of the side door being subjected to force caused by an accident and running at least substantially in the transverse direction of the vehicle and acting on the side door from the outside inwards, if no corresponding countermeasures are taken. A motor vehicle having a side door that has a corresponding reinforcement element that works together with a side sill in the event of a side impact already proceeds from the generic DE 10 2011 101 533 A1. Due to new barriers for the side impact test, which have a significantly higher mass, and which are driven against the motor vehicle to be tested at greater speed, it has been shown that a B pillar of the motor vehicle can absorb less energy, and increased intrusions of the side door occur, which can lead in turn to the side sill being moved over despite a corresponding reinforcement element, which can lead the barrier to intrude deeply into the interior of the motor vehicle, and cause an overload of joint connections of individual components, particularly of the reinforcements.

A side door of a motor vehicle proceeds from DE 10 2014 018 662 A1 which has an inner door part, an internal, extended door base reinforcement part and an outer planking. The door base reinforcement element is supported on a side sill of the vehicle body in the event of a side impact, and is formed as an extruded profile, which is relatively expensive to produce, and cannot be installed across all model series, or not without difficulty, such that a separate door base reinforcement part must often be provided for each vehicle model series. The extruded profile has a number of chambers that respectively immediately border one another and that respectively form a deformation region in the event of a crash. A similar side door also proceeds from DE 10 2013 009 923 A1, wherein the door base reinforcement part is either also formed as an extruded profile or, according to a second exemplary variant, is alternatively formed as an impact foam here. It has been shown that adapting a vehicle door to country-specific crash requirements in the case of a foam part leads to foam parts specific to the model series also having to be used here, which also leads to high overall manufacturing costs.

It is the object of the present invention to further develop a motor vehicle of the kind specified in the introduction in such a way that it has an improved accident behaviour, particularly in the event of a side impact or side impact test according to the Insurance Institute for Highway Safety (IIHS), and can additionally be manufactured in a cost-effective manner, and can preferably also be used in a cost-effective manner for different side doors or for the same side door, and for different, e.g., country-specific crash requirements.

In the case of an arrangement of a side door on a body of a motor vehicle, particularly of a passenger car, the side door is held on the body, at least partially overlapping a side sill of the body in the transverse direction of the vehicle, at least in relation to a closed position of the side door in which a doorway corresponding to the side door is closed. In other words, the side door is arranged at least partially overlapping the side sill in relation to the transverse direction of the vehicle, at least if the side door is closed. The side door, particularly a door part of the side door, overlaps the side sill here at least partially towards the outside in relation to the transverse direction of the vehicle.

Side doors, particularly side doors of a motor vehicle, usually comprise a door shell having an inner door part and a planking element, via which the outside of the inner door part is at least partially clad. Side doors additionally usually comprise a kerb reinforcement that reinforces the inner door part in the region of the kerb. The side door further comprises at least one side impact support fixed to the inner door part to increase stability.

The motor vehicle according to the invention comprises a body having at least one doorway, on which a side door is moveably held and can be displaced between a closed position closing the doorway and an open position at least partially freeing the doorway, wherein the side door comprises an inner door part, at least one reinforcement element, and a planking element at least partially cladding the outer side of the inner door part, wherein the reinforcement element formed as an elongated profile part, having at least two deformation regions arranged at different heights in the vertical direction of the motor vehicle, is arranged at least partially overlapping a side sill of the body when the side door is arranged in the closed position in relation to the transverse direction of the motor vehicle, and via which reinforcement element the side door can be supported on the side sill in the event of a force caused by an accident acting on the side door from the outside inwards in the transverse direction of the motor vehicle. The motor vehicle is characterized in that a first, upper deformation region and a second, lower deformation region are provided, which are arranged at such a spacing from each other, and respectively opposite a standing surface on which the motor vehicle is parked, that, in the event of a side impact test with a barrier having a large-area first barrier portion and a smaller second barrier portion protruding forwards from the former in the direction of the motor vehicle, only the upper deformation region—when viewed in the transverse direction of the motor vehicle—overlaps the second barrier portion of the barrier.

In a particularly advantageous embodiment, at least one impact damper formed as a foam part is provided inside the side door between the reinforcement element and the side sill, the impact damper extending over at least a partial length of the reinforcement element and substantially completely filling a cavity delimited between the reinforcement element and the inner side door part. In connection with the present invention, "completely filling the cavity by means of the foam part" is understood to mean that the foam part extends over the entire breadth or, depending on tolerance, only substantially over the entire breadth of the cavity, such that immediately in the event of the reinforcement element being subjected to force caused by a crash, the reinforcement element is supported on the side sill via the foam part and the inner door part as early as possible.

A motor vehicle is also suggested to solve this object. This motor vehicle is characterized in that the reinforcement element or its at least one deformation region is supported on the side sill of the body via the foam part arranged between the reinforcement element and the inner door part, and thus prevents the side door from being pulled upwards over the side sill in the event of a side impact of a collision partner, e.g., of a crash barrier for test purposes. A force path is thus built up via the reinforcement element and the foam part into the side sill after an intrusion of the side door begins, wherein the resulting force prevents the side door from being pulled over into the side sill. This force is accordingly correspondingly aligned relative to the side sill, which can be realized by means of a corresponding layout and arrangement of the reinforcement element and of the foam part. The force direction or the force path into the side sill is preferably aligned horizontally, i.e., in parallel to the transverse direction of the vehicle, or alternatively downwards in the direction of the road, such that the foam part effectively digs into the side sill, and, optionally, the reinforcement element also effectively digs into the foam part. The construction of the side door according to the invention particularly has the advantage that a metallic sheet metal component, particularly a deep-drawn component, that is cost-effective at least in comparison with an extruded profile can be used for the reinforcement element, the sheet metal component not having the required qualities for the side impact in isolation, but enabling the desired support on the side sill in combination with the likewise relatively cost-effective foam part. The total weight of the side door can thus be kept low.

In a preferred embodiment of the invention, the barrier for the side impact test is an IIHS barrier, preferably according to the standard valid on the day of application, particularly according to FIGS. 6 to 8.

The invention is illustrated in more detail in the following with reference to the drawings.

DETAILED DESCRIPTION OF THE DRAWINGS

Figure 1:
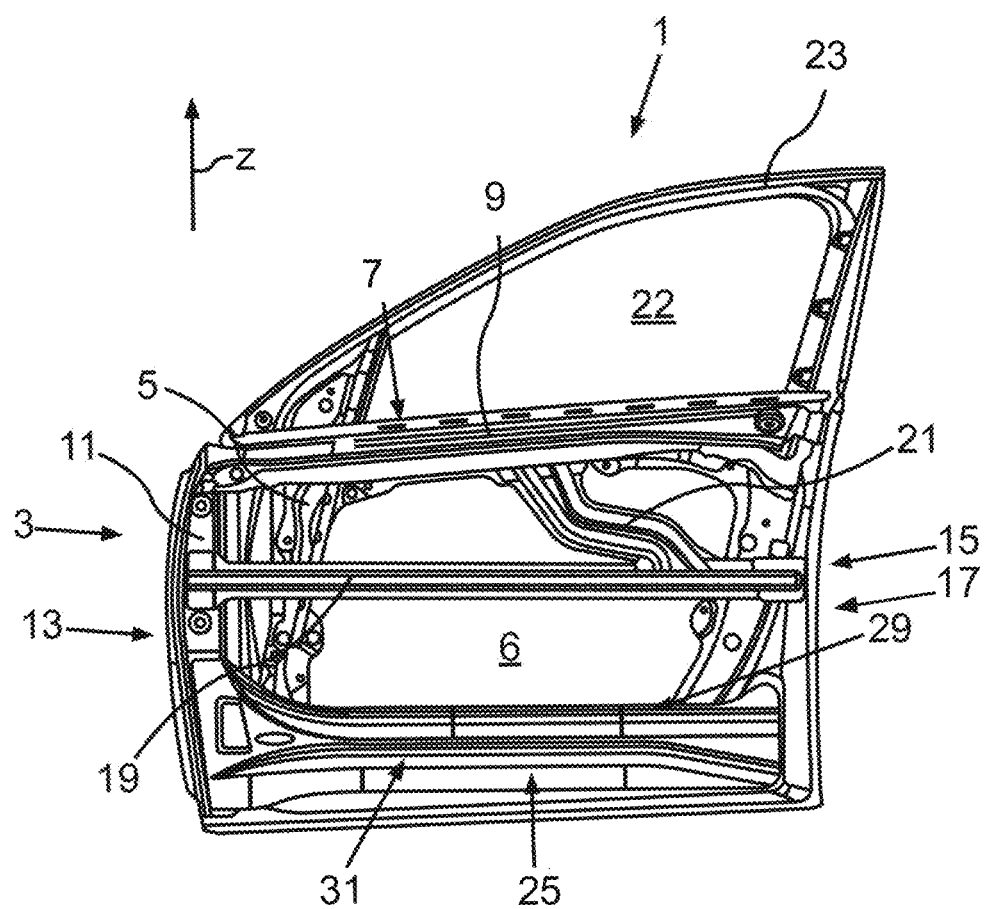
FIG. 1 shows a schematic depiction of an exemplary embodiment according to the invention of a side door of a passenger car in a front view from the outside of the motor vehicle and outer planking (not depicted)

Identical parts are provided with the same reference numerals, such that reference is made to the description of the preceding figures in this respect.

FIG. 1 shows a schematic depiction of an exemplary embodiment of a side door 1 of a passenger car having a reinforcement frame 7 in a side view. The side door 1 is a front door, in particular the driver's door of the preferably four-door passenger car, the door having a window frame 23 in this exemplary embodiment. In an alternative exemplary embodiment, the side door 1 is formed without a window frame 23 of this kind, e.g., as a side door 1 for a cabriolet or as a back door of a motor vehicle having at least four doors.

The motor vehicle has a body provided with at least one door opening, on which the side door 1 is moveably held and can be displaced between a closed position closing the doorway and an open position freeing the doorway at least partially.

Figure 2:
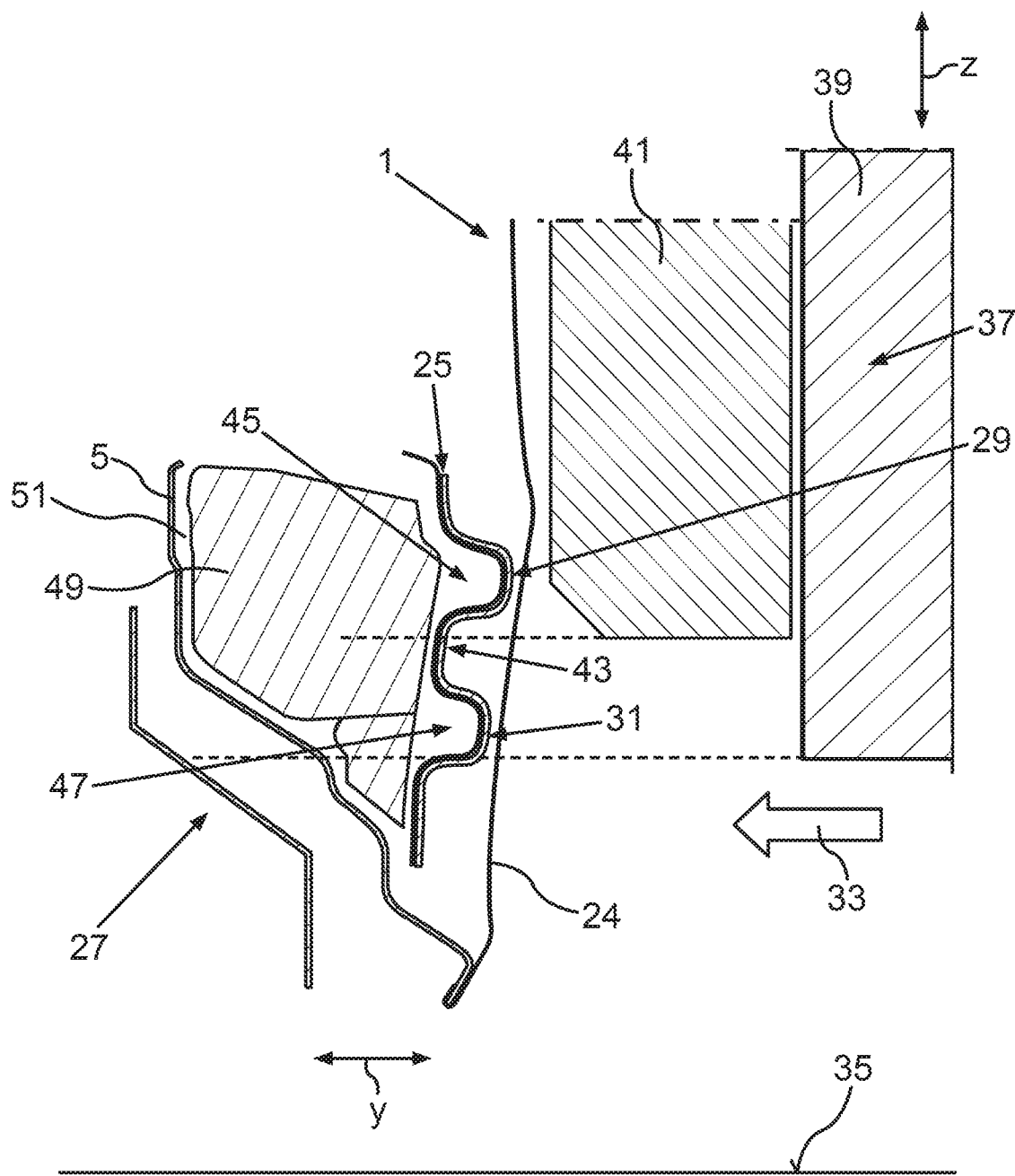
FIG. 2 shows a portion of the largely schematically depicted side door arranged on the motor vehicle in a cross-sectional view, having a first exemplary embodiment of a reinforcement element arranged neighbouring a side sill and a part of an IHSS barrier.

The side door 1 comprises a door support structure 3, also described as a door shell, having an inner door part 5, and a window frame 23 provided on the latter that delimits an opening 22 for the one side pane. A planking element 24 that can be partially recognized in FIG. 2 is additionally provided, by which the outside of the inner door part 5 is at least partially clad. The planking element 24 effectively forms a part of the outer skin of the passenger car. The inner door part 5 has a relatively large opening 6 in its central region that is closed around its circumference.

The side door 1 further has the reinforcement frame 7 that is closed around its circumference in the exemplary embodiment shown for reinforcing the door support structure 3, particularly the inner door part 5, wherein the reinforcement frame 7 is installed on the outside, i.e., on the side facing the planking element, on the inner door part 5. The reinforcement frame 7 comprises a kerb reinforcement 9 running along the kerb, a first frame element 11 on a first edge region 13 of the inner door part 5, a second frame element 15 on a second edge region 17 of the inner door part 5, at least one lower reinforcement strut 19, wherein the at least one lower reinforcement strut 19 connects the first frame element 11 to the second frame element 15, and at least one upper reinforcement strut 21, wherein the at least one upper reinforcement strut 21 connects the kerb reinforcement 9 to the lower reinforcement strut 19. The kerb reinforcement 9 reinforces the side door 1 in the region of the kerb. The kerb reinforcement 9, the frame elements 11, 15 and the reinforcement struts 19, 21 are joined with one another to the reinforcement frame 7, wherein this can occur before they are installed on the inner door part 5, such that the pre-assembled reinforcement frame 7 can be introduced onto the inner door part 5 as a whole and fixed thereto, or, alternatively, the individual parts 9, 11, 15, 19, 21 are only connected to the reinforcement frame 7 and to one another at the inner door part on this inner door part.

The first frame element 11 extends in the z direction in the motor vehicle coordinate system along a partial portion of the first edge region 13, on which a hinge arrangement is installed on a door pillar (not depicted), particularly an A pillar of the body, in the state of the side door 1 installed on the passenger car for pivotably displacing the same.

The second frame element 15 extends along a partial portion of the second edge region 17 of the inner door part 5 that has a curved course here, the second frame element being located in the region of a B pillar of the passenger car in the state of the side door 1 installed on the passenger car. The second frame element 15 runs substantially in the z direction, following the contour of the edge region 17 here.

The lower reinforcement strut 19 also particularly serves as side impact protection, and is thus also described as a side impact protection profile. The profile and the wall strength of the reinforcement strut 19 is selected according to its function. The reinforcement strut 19 is fixed to the first frame element 11 on one end and to the second frame element 15 on the other end, such that these frame elements are connected to each other via or by means of the reinforcement strut 19. As can be seen from FIG. 1, the reinforcement strut 19 is fastened to the frame element 11 approximately in the centre region of the frame element, and thus between the upper and lower hinges of the side door. The reinforcement profile 19 runs approximately in parallel to an imaginary horizontal line.

Figure 3:
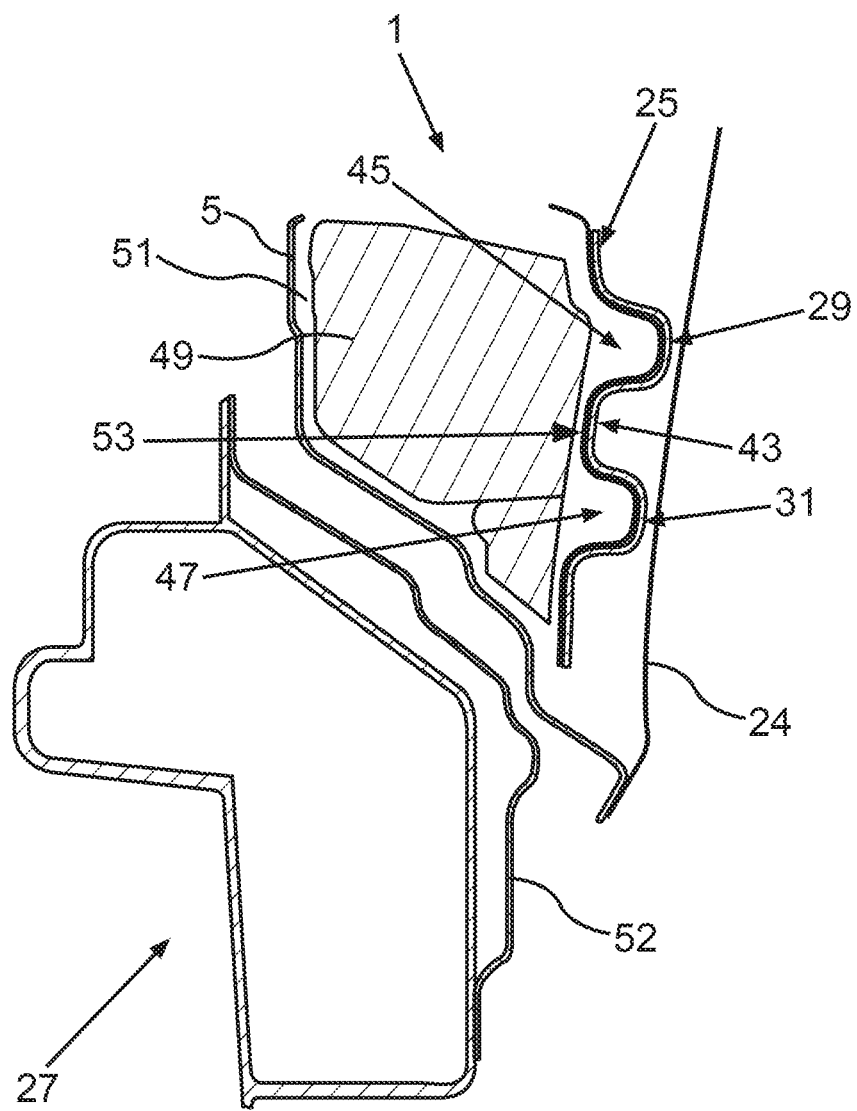
FIG. 3 shows a portion of the largely schematically depicted side door arranged on the motor vehicle in a cross-sectional view, having a second exemplary embodiment of the side sill and the reinforcement element.
Figure 5:
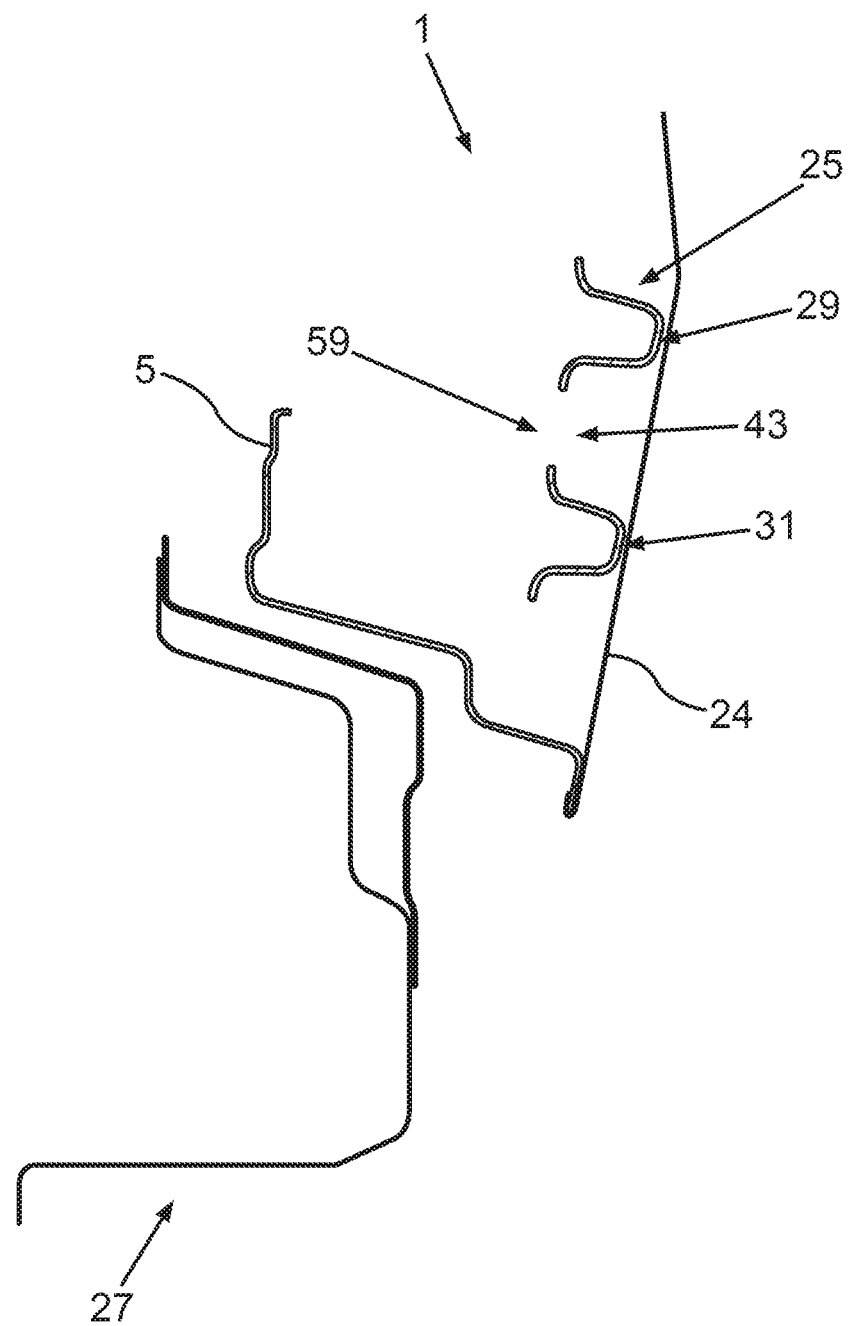
FIG. 5 shows a portion of the largely schematically depicted side door arranged on the motor vehicle in a cross-sectional view, having a third exemplary embodiment of the reinforcement element.

By means of the reinforcement struts 19, 21, the kerb reinforcement 9 and the frame elements 11, 15 within the reinforcement frame 7, a particularly high stiffness and stability of the side door 1 is achieved, which is further increased by means of a reinforcement element 25 formed as an extended profile part that is substantially arranged in the lower region of the side door 1, in parallel to an imaginary horizontal line and—in the state of the side door 1 mounted on the motor vehicle—neighbouring a side sill 27 partially depicted in FIGS. 2, 3 and 5. As can be easily seen from FIG. 1, the reinforcement element 25 extends from the front first edge region 13 to the back second edge region 17, and is fixed to the frame element 11 on its end facing the front edge region 13 of the side door 1, and directly to the inner door part 5 on its end facing the back edge region of the side door 1 in this exemplary embodiment. Other fastening variants for at least indirectly fixing the reinforcement element 25 to the door body, i.e., to the inner door part 5, are possible in principle.

As can be seen in FIG. 1, and also particularly in FIGS. 2, 3 and 5, which each show an exemplary variant of the reinforcement element 25, the reinforcement element has two deformation regions 29 and 31 arranged at different heights in the vertical direction of the motor vehicle (z direction), which is arranged at least partially overlapping a side sill 27 of the motor vehicle body when the side door 1 is arranged in the closed position in relation to the transverse direction of the motor vehicle (y direction), and via which reinforcement element the side door 1 can be supported on the side sill 27 in the event of force caused by an accident acting on the side door 1 from the outside inwards in the transverse direction of the motor vehicle that is indicated in FIG. 2 by an arrow 33, which is explained in more detail in the following.

The first, upper deformation region 29 and the second, lower deformation region 31 are arranged at such a spacing from each other, and respectively opposite a standing surface on which the motor vehicle is parked, e.g., the road, that, in the event of a side impact test with an IIHS barrier 37, the two deformation regions 29, 31 are not subjected to force by the IIHS barrier 37 simultaneously, but one after the other. In the description of the construction and the mode of operation of the invention in the following, it is assumed that the barrier 37 is a so-called IIHS barrier that has different deforming regions, which is explained in more detail in the following. Other barriers are also conceivable in principle, however, which however must feature the different barrier portions 39, 41.

Figure 6:
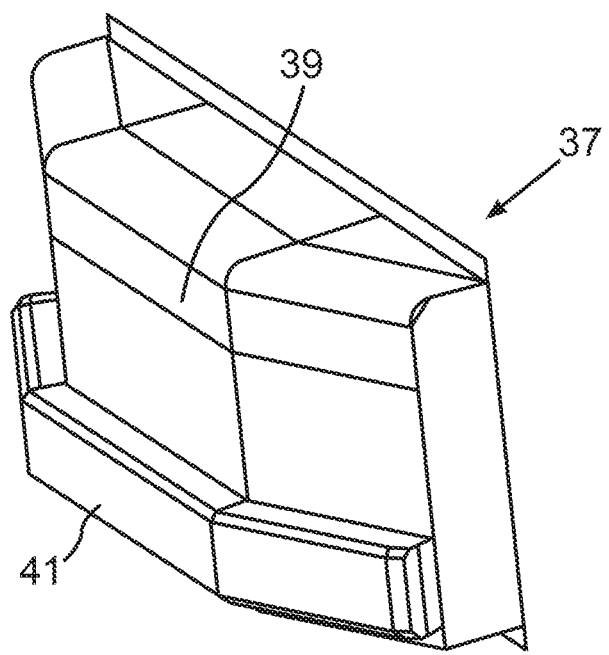
FIG. 6 shows a side impact test barrier in a perspectival view having the designation SG60 of the Insurance Institute for Highway Safety (IIHS)

The special barrier 37 is first explained in the following. This barrier 37 is used by the "Insurance Institute for Highway Safety", IIHS for short, for a side impact test, particularly for passenger cars. The "Insurance Institute for Highway Safety" is an American non-profit organisation that is financed by car insurers and is based in Arlington (USA). Different views of the IIHS barrier 37 are depicted in FIGS. 6 to 8, partially provided with measurements in which the specifications are in millimetres.

The IIHS barrier 37 comprises a large-area first barrier portion 39 and a smaller second barrier portion 41 protruding forwards from the former in the direction of the motor vehicle as seen in the direction of the subjection to force (arrow 33), i.e., in the y direction in the vehicle coordinate system. The second barrier portion 41 should simulate or reproduce a shock absorber or a shock absorber bending crossmember of another motor vehicle, while the first barrier portion 39 should reproduce the remaining part of the motor vehicle. Different stiffnesses are assigned to the IIHS barrier 37 for this purpose, i.e., its centre is softer than its outer regions. As can easily be seen from FIGS. 6 to 8, the IIHS barrier 37 has a sweep in the direction in which it collides with the motor vehicle, i.e., there is a centre region on each of the two barrier portions 39, 41 from which edge regions protrude outwards and backwards or are arranged running backwards on the left and right end face. This new IIHS barrier 37 has a weight of 1900 kg and is moved into the motor vehicle at 60 km/h during the side impact test, which leads to an enormous energy transfer into the motor vehicle.

Figure 7:
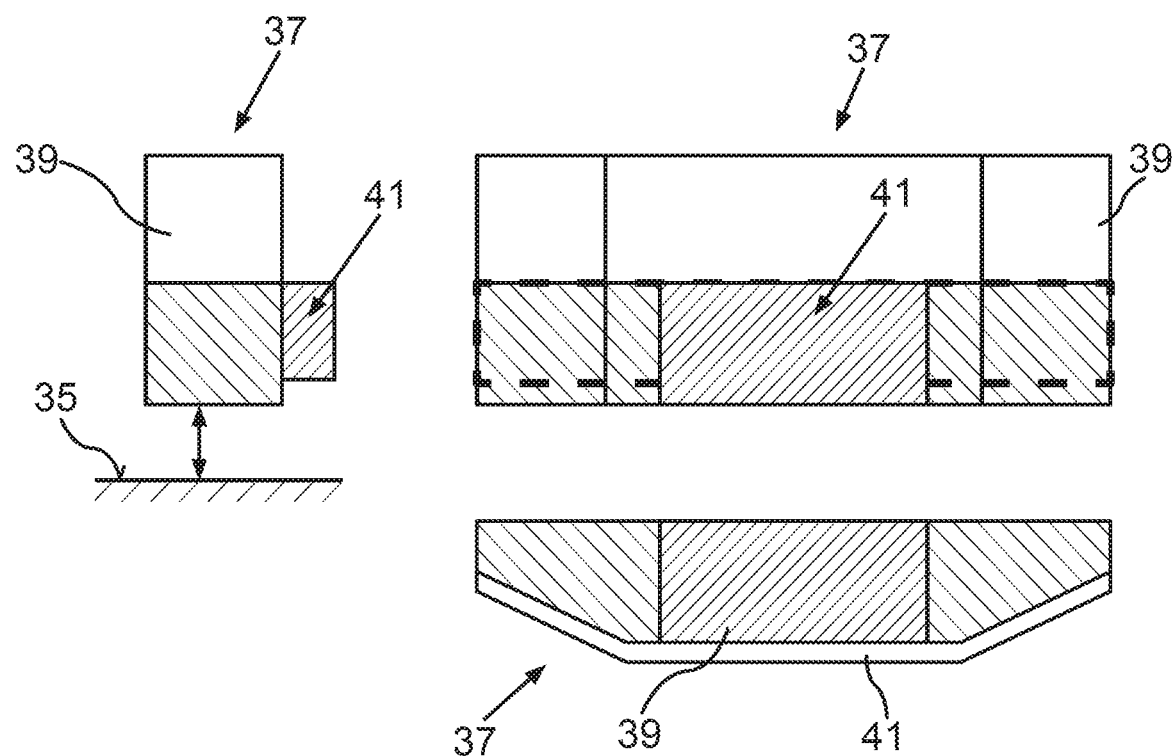
FIG. 7 shows a side view, front view and aerial view of the IIHS barrier according to FIG. 6 having dimensions, wherein the dimensions only specify the order of magnitude and should not be seen as a respective absolute measurement.
Figure 8:
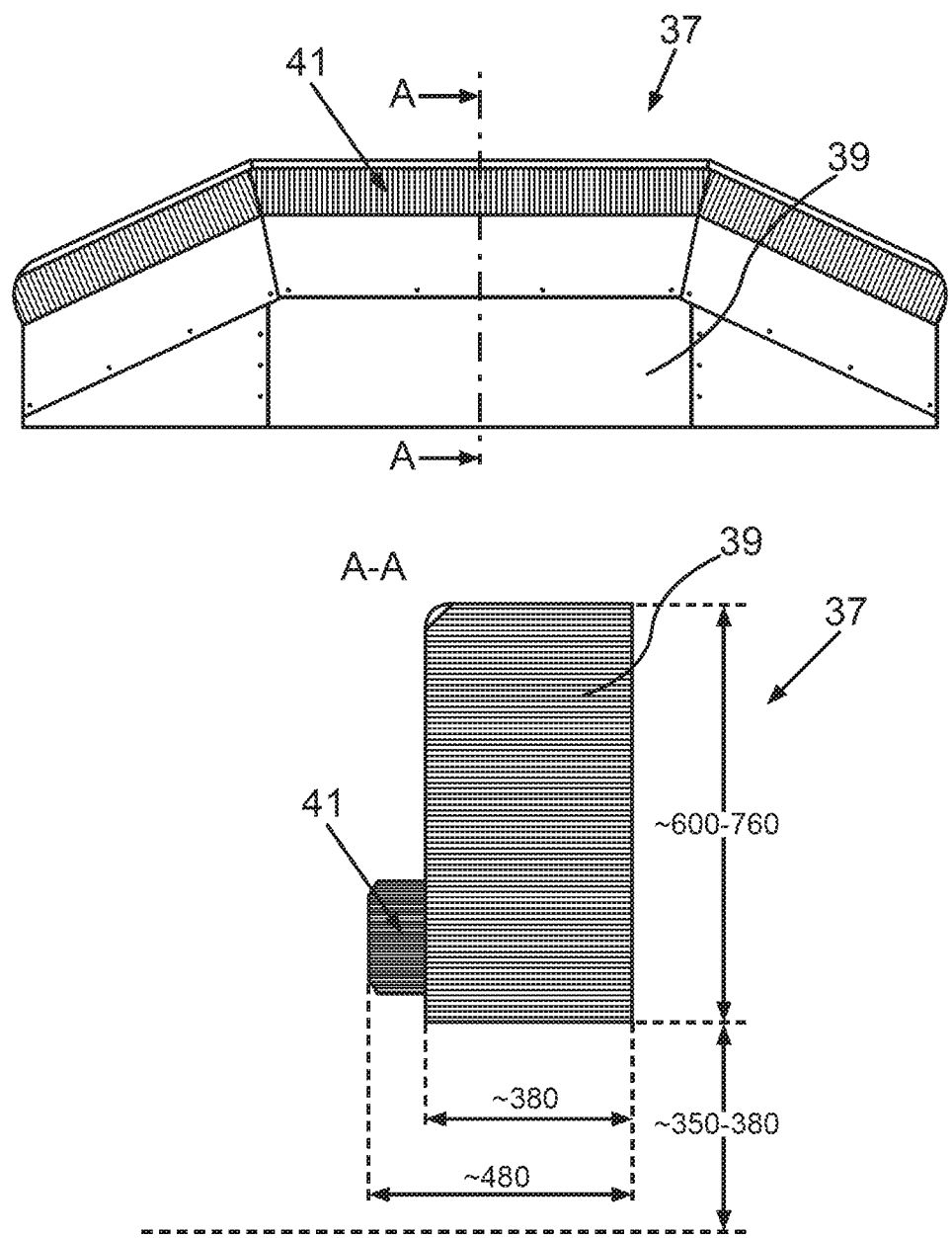
FIG. 8 shows a side view and an aerial view of the IIHS barrier according to FIG. 6 having specifications of dimension ranges of the barrier.

As can particularly be seen from the left-hand depiction of FIG. 7, the intended spacing from the lower edge of the first barrier portion 39 to the standing surface 35 on which the motor vehicle to be tested is standing is 350 mm. This specification, and also the following specifications with regard to the specified measurements and spacings, as well as the measurements and spacings given in FIGS. 6 and 8, should not, or not in all instances, be seen as absolute measurements or absolute spacings, but rather can also be larger or smaller to a limited extent. The spacing between the lower edge of the second, front barrier portion 41 and the standing surface 35 is 400 mm here.

The side crash behaviour of the side door 1 having the reinforcement element 25 is explained in the following with reference to FIG. 2. The reinforcement element 25 is arranged relative to the side sill 27 in the state of the side door 1 mounted on the motor vehicle such that the lower deformation region 31 is arranged overlapping this side sill 27 in the transverse direction of the vehicle (y direction), while the upper deformation region 29 of the reinforcement element 25 is arranged practically without overlapping the side sill 27. The arrangement of the deformation regions 29, 31 in relation to the vertical direction of the vehicle (z direction) and relative to the IIHS barrier 37 is selected such that, in the event of a side impact test with the IIHS barrier 37, the barrier's second front barrier portion 41 is effectively pulled over the lower deformation region 31, and is thus not subjected to force, but instead only hits the upper deformation region 29, whereby this barrier portion is pushed inwards or displaced in the y direction in the direction of the motor vehicle interior. A banking inward of the upper deformation region 29 practically occurs here around a connecting portion 43 of the reinforcement element 25 arranged between this upper deformation region and the lower deformation region 31 anti-clockwise in the direction of the side sill 27. Due to this displacement of the upper deformation region 29 forced by the front barrier portion 41, this leads to the upper deformation region 29 being caught on the side sill 27, which the upper deformation region no longer effectively overlaps. The side door 1 is thus prevented from being pushed or pulled over the side sill 27, and also with the assistance of the lower deformation region 31 of the reinforcement element 25. The lower deformation region 31 is actually only hit by the IIHS barrier 37 subsequently, specifically only with its barrier portion 39 protruding further downwards in the direction of the standing surface 35, the barrier portion also shifting the lower deformation region 31 into the side sill 27. It remains to be noted that the lower edge of the side door 1 is prevented from being pulled over the side sill 27 due to the embodiment and arrangement according to the invention of the reinforcement element 25 in relation to the side sill 27 and the impacting IIHS barrier 37.

It is provided in a preferred embodiment of the invention that the spacing of the lower edge of the upper deformation region 29 of the reinforcement element 25 from the standing surface 35 is greater than 400 mm.

An exemplary embodiment is also preferred in which the spacing of the lower edge of the lower deformation region 31 of the reinforcement element 25 from the standing surface is at least 300 mm, preferably at least 350 mm.

An exemplary embodiment is further preferred in which the upper deformation region 29 of the reinforcement element 25 is arranged—when viewed in the transverse direction of the motor vehicle (y direction)—without overlapping or almost without overlapping the side sill 27 in the undamaged state of the motor vehicle.

In the exemplary embodiment depicted in FIG. 2, the upper and lower deformation regions 29, 31 of the reinforcement element 25 are respectively formed by a corrugation 45 or 47. These corrugations 45, 47 are gutter-like depressions that serve not only to stiffen the reinforcement element 25, but also as energy absorption regions The two corrugations are kept spaced apart from each other via the even connecting portion 43, but still held on each other. In this exemplary embodiment, the corrugations are formed as embossed portions in the reinforcement element 25 preferably formed as one part.

It can easily be seen from FIG. 2 that a base region of the respective corrugation 45, 47 faces the outside of the motor vehicle. It should further be recognized that at least one impact damper 49 is provided between the reinforcement element 25 and the side sill 27 inside the side door 1, the impact damper extending over at least a partial length of the reinforcement element 25 and substantially completely filling a cavity 51 delimited between the reinforcement element 25 and the inner side door part 5. The impact damper 49 can be formed as a foam part in an advantageous manner. Firm foam parts of this kind are known, such that no further explanation needs to be made here.

FIG. 3 shows a further exemplary embodiment of the side door 1 in which a reinforcement element 25 is provided analogously to the exemplary embodiment according to FIG. 2, and which is provided with a flat reinforcement component 53 on its side facing the side sill 27 or an interior of the motor vehicle for stiffness reasons, which is formed such that a material doubling is given in the region of the upper deformation region 29 and along the connecting portion 43, while the reinforcing component 53 spans the corrugation 47 in the region of the lower deformation portion 31, such that no material doubling is given in its base region. It should further be recognized that the largely schematically depicted side sill 27 is formed as an extruded profile here, and has several chambers (not depicted) closed around their circumference, while the side sill 27 is embodied as a shell construction in FIG. 2, wherein only a sill outer shell is depicted in FIG. 2. An impact damper 49 can naturally also be used in the exemplary embodiment according to FIG. 3. A sill outer cladding 52 is further also depicted.

Figure 4:
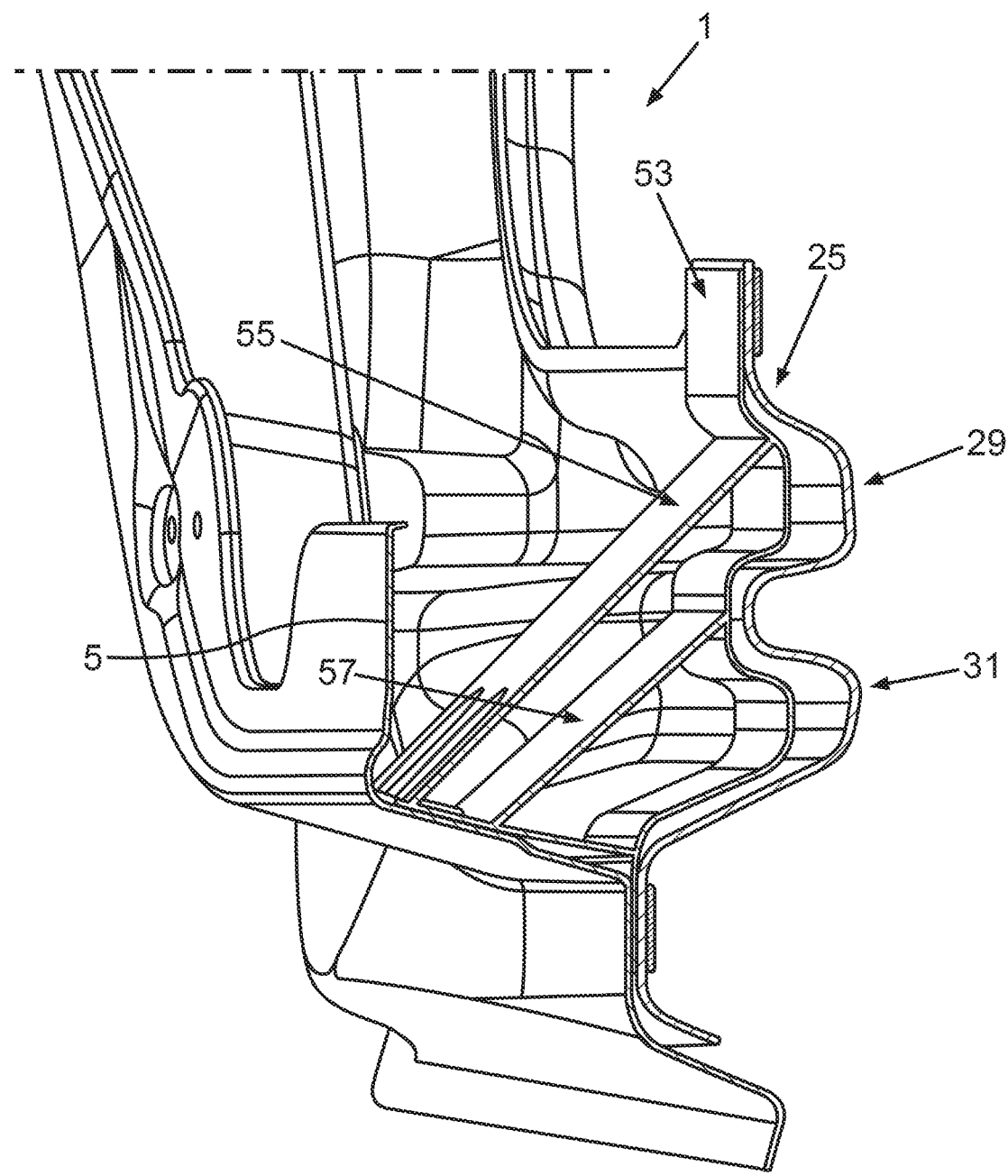
FIG. 4 shows a portion of the largely schematically depicted side door in a perspective depiction in a cross-sectional view, having the reinforcement element according to FIG. 2 and a first exemplary embodiment of a supporting element working together with the reinforcement element.

A further exemplary embodiment of the side door 1 having a further embodiment of the reinforcement element 25 proceeds from FIG. 4, which differs from the exemplary embodiment described with reference to the exemplary embodiment described in FIG. 2 principally in that the reinforcement component 53 is formed as an extruded profile, preferably made from metal that has a cross section following the contour of the reinforcement element 25 in the region of the deformation regions 29, 31 and the connecting portion 43 between them, and is arranged such that no material doubling occurs in these regions, but rather a gap occurs between the reinforcement component 53 and the reinforcement element 25. The reinforcement component 53 further has two support portions 55 and 57 running obliquely downwards in the direction of the side sill 27 (not depicted), which run up to the inner door part 5 and are optionally fixed thereon. The upper support portion 55 lies approximately at the height of the upper deformation region 29 in its end region facing the reinforcement element 25 in the vertical direction of the vehicle, such that a force path can build up directly to the side sill 27 in the event of a subjection to force by the lower barrier portion 41 of the IIHS barrier 37. The lower support portion 57 lies approximately at the height of the connecting portion 43 in its end region facing the reinforcement element 25 in the vertical direction of the vehicle, such that in the event of a subjection to force by the lower barrier portion 41 of the IIHS barrier 37, a banking inwards of the connecting portion 43 that is too early and too steep is avoided.

A further exemplary embodiment of the side door 1 having a further embodiment of the reinforcement element 25 proceeds from FIG. 5, which differs from the exemplary embodiment described with reference to FIG. 2 substantially in that the reinforcement component 53 has at least one weakening in the form of an access opening 59, and thus a particularly hollow region in the region of its connecting portion 43 connecting the deformation regions 29, 31. Several such access openings 59 can also be provided in the longitudinal extension of the reinforcement element 25. In another exemplary embodiment of the reinforcement element 25, the reinforcement element is practically formed in two parts, i.e., no connecting portion 43 is provided between the deformation regions 29, 31, such that these deformation regions are respectively formed as an extended profile part, which are arranged corresponding to each other and are at least indirectly fixed to the inner door part 5.

In a preferred exemplary embodiment of the reinforcement frame 7, the reinforcement frame is not formed as one material, i.e., the reinforcement elements 19, 21, the frame elements 11, 15 and the kerb reinforcement 9 can respectively or also only partially consist of different materials. The reinforcement element 25 can also be formed of another material than the kerb reinforcement 9, for example.

In summary, it remains to be noted that the side door 1 has a particularly advantageous behaviour in the event of a side crash due to the embodiment according to the invention. The arrangement and embodiment of the reinforcement element 25 is essential hereto, wherein the reinforcement element 25 effectively catches on the side sill 27 in the case of a closed side door 1 in the event of a crash, but at least is supported thereon, such that the side door 1 is also prevented from being pulled over the side sill, or the danger of the side door being pulled over is at least reduced.

The invention claimed is:
1. A motor vehicle, comprising:
a body that has a doorway and a side sill;
a side door (1) moveably held on the doorway and displaceable between a closed position closing the doorway and an open position at least partially freeing the doorway;

wherein the side door (1) has an inner door part (5), a reinforcement element (25), and a planking element (24) at least partially cladding an outer side of the inner door part (5);

wherein the reinforcement element (25) is an elongated profile part that has an upper deformation region (29) and a lower deformation region (31) in a vertical direction of the motor vehicle, wherein the reinforcement element (25) is disposed at least partially overlapping the side sill (27) of the body when the side door (1) is in the closed position in relation to a transverse direction of the motor vehicle, wherein the upper deformation region (29) is disposed without overlapping the side sill (27) in an undamaged state of the motor vehicle when viewed in the transverse direction of the motor vehicle, wherein the lower deformation region (31) is disposed overlapping the side sill (27) in the undamaged state of the motor vehicle in the transverse direction of the motor vehicle, wherein the upper deformation region (29) is formed by a first corrugation (45), the lower deformation region (31) is formed by a second corrugation (47), and a respective base region of the respective corrugations (45, 47) faces an outer side of the motor vehicle, and wherein via the reinforcement element the side door (1) is supportable on the side sill (27) in an event of a force caused by an accident acting on the side door (1) from an outside inwards in the transverse direction of the motor vehicle;

wherein the upper deformation region (29) and the lower deformation region (31) are disposed at a spacing from each other and opposite a standing surface (35) on which the motor vehicle is parked, such that, in an event of a side impact test with a barrier (37) having a first barrier portion (39) and a second barrier portion (41) protruding forward from the first barrier portion (39) in a direction of the motor vehicle:

the second barrier portion (41) of the barrier (37) is pulled over the lower deformation region (31), and is thus not subjected to force, but instead only hits the upper deformation region (29) such that the second barrier portion (41) is pushed inwards or displaced in the transverse direction of the motor vehicle and such that a banking inward of the upper deformation region (29) occurs around a connecting portion (43) of the reinforcement element (25) that is disposed between the upper deformation region (29) and the lower deformation region (31) counter-clockwise in a direction of the side sill (27), wherein due to the banking inward of the upper deformation region (29) the upper deformation region (29) is caught on the side sill (27) such that the side door (1) is prevented from being pushed or pulled over the side sill (27); and the lower deformation region (31) is only hit by a portion of the first barrier portion (39) that protrudes downwards in a direction of the standing surface (35) beyond the second barrier portion (41) such that the portion of the first barrier portion (39) shifts the lower deformation region (31) into the side sill 27; and an impact damper (49), wherein the impact damper (49) is a foam part and is disposed inside the side door (1) between the reinforcement element (25) and the side sill (27) and wherein the impact damper (49) extends over at least a partial length of the reinforcement element (25) and substantially completely fills a cavity (51) delimited between the reinforcement element (25) and the inner door part (5).

2. The motor vehicle according to claim 1, wherein a spacing of a lower edge of the upper deformation region (29) to the standing surface (35) is greater than 400 mm.

3. The motor vehicle according to claim 1, wherein a spacing of a lower edge of the lower deformation region (31) to the standing surface (35) is at least 300 mm.

* * * * *